May 21, 1963  R. K. SWANSON ETAL  3,090,867
METHOD OF AND APPARATUS FOR RADIOACTIVITY WELL LOGGING
Filed Oct. 14, 1957  5 Sheets-Sheet 1
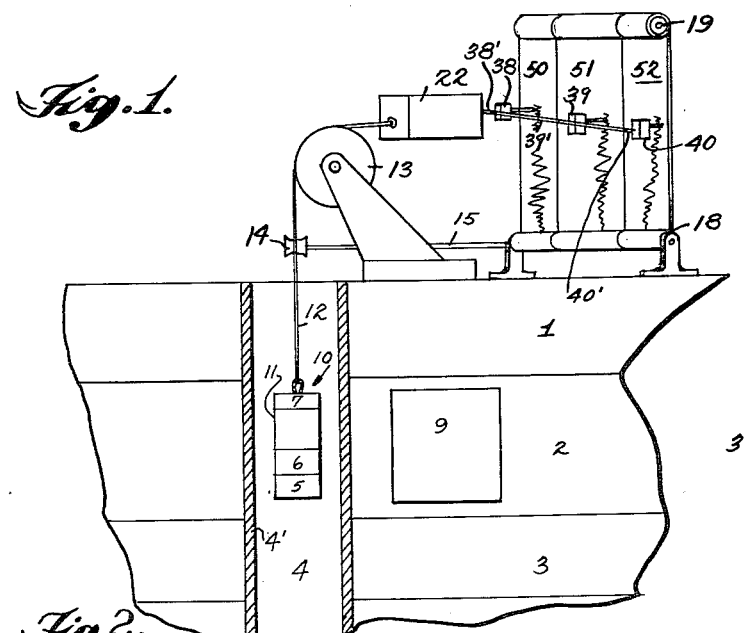
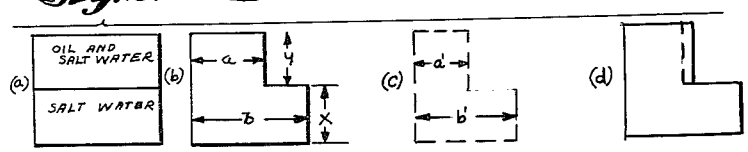
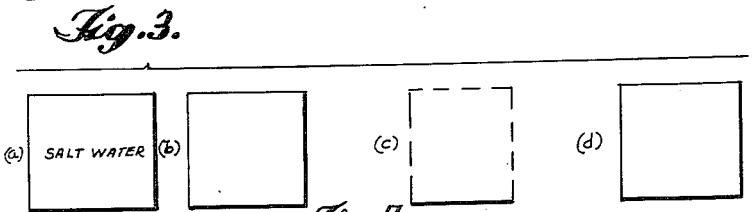
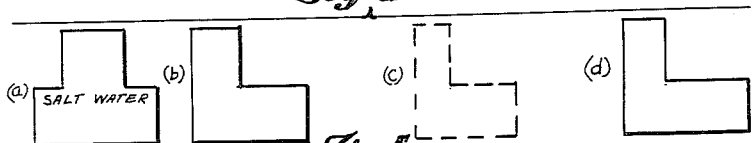
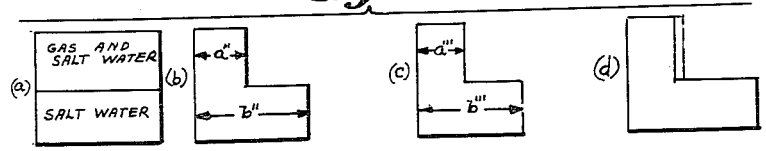
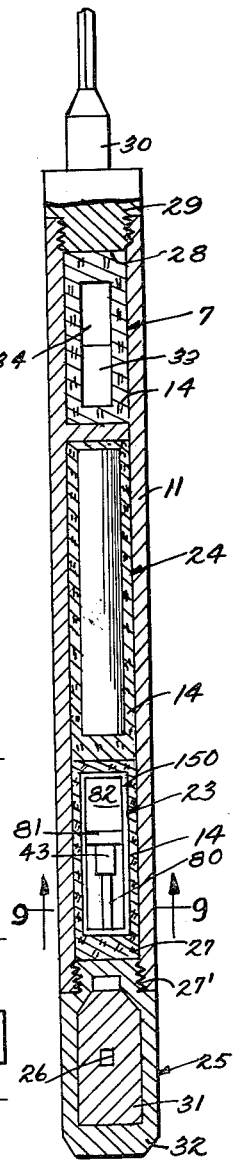
INVENTORS
R. K. SWANSON
C. E. JAMESON
G. W. DINGUS
BY Cushman, Darby & Cushman
ATTORNEYS Fig. 8.
Fig. 7.
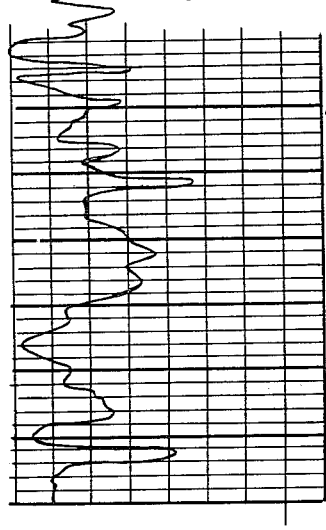
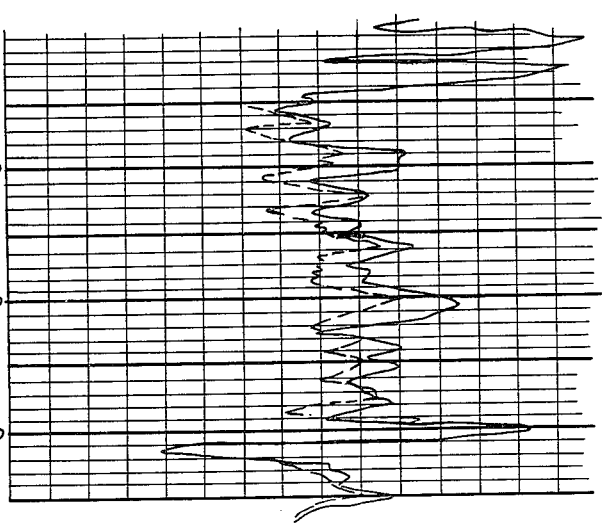
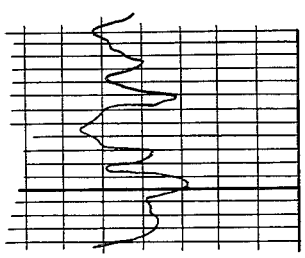
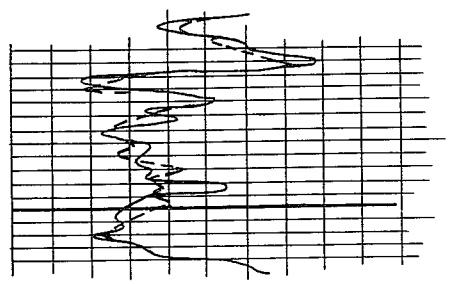
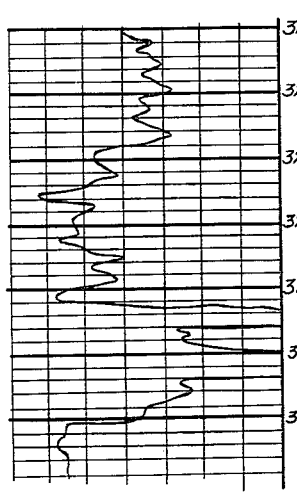
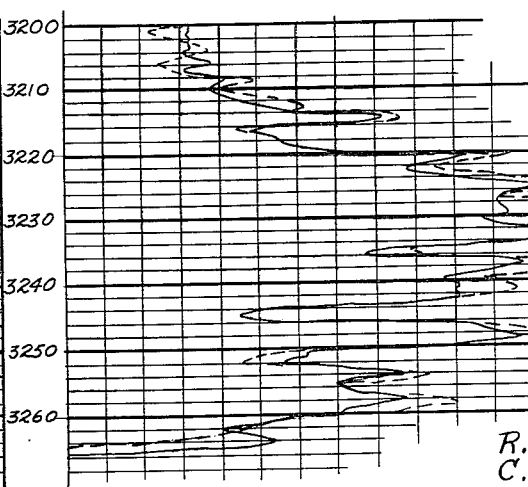
INVENTORS
R. K. SWANSON
C. E. JAMESON
G. W. DINGUS
BY Cushman, Darby & Cushman
ATTORNEYS May 21, 1963   R. K. SWANSON ETAL   3,090,867
METHOD OF AND APPARATUS FOR RADIOACTIVITY WELL LOGGING
Filed Oct. 14, 1957   5 Sheets-Sheet 3

INVENTORS
R. K. SWANSON
C. E. JAMESON
G. W. DINGUS
BY Cushman Darby & Cushman
ATTORNEYS May 21, 1963  R. K. SWANSON ETAL  3,090,867
METHOD OF AND APPARATUS FOR RADIOACTIVITY WELL LOGGING
Filed Oct. 14, 1957  5 Sheets-Sheet 4

INVENTORS
R. K. SWANSON
C. E. JAMESON
G. W. DINGUS
BY Cushman, Darby & Cushman
ATTORNEYS INVENTORS
R. K. SWANSON
C. E. JAMESON
G. W. DINGUS
BY Cushman, Darby & Cushman
ATTORNEYS

United States Patent Office 3,090,867
Patented May 21, 1963

3,090,867
METHOD OF AND APPARATUS FOR RADIO-
ACTIVITY WELL LOGGING
Robert K. Swanson, Charles E. Jameson, and George W.
Dingus, all of P.O. Box 1678, Pampa, Tex.
Filed Oct. 14, 1957, Ser. No. 690,090
5 Claims. (Cl. 250—83.3)

This invention relates to a method and apparatus for geophysical exploration. In particular, it relates to a method and apparatus for radioactivity well logging which enables identification of substances such as oil and gas contained in substrata formations adjacent a bore hole.

Radioactivity characteristics have heretofore been used to determine the nature of substrata formations which make up the earth's crust. Some of the methods suggested for using those characteristics concern measurements of radiation resulting from nuclear transformations that take place within the earth's crust because of the presence of naturally radioactive substances or because of irradiation of the formations with neutrons or gamma rays. Other methods concern measuring the energy of neutrons which have come in contact with the constituent elements of the formations.

Sedimentary formations are of particular interest because oil and gas reservoirs are known to be located in such formations. These formations include sandstones, shales and limestones and dolomites. The sandstones are known to be composed of relatively pure silicon dioxide and the limestones and dolomites consist largely of calcium and magnesium carbonates. Shale, on the other hand, is an impure conglomeration generally consisting of the residue of mud and slime. Accordingly, shale formations could be expected to emit more natural radiation than the sandstone or limestone and dolomite formations.

Using the natural radioactivity characteristics of formations as a basis, a method of logging oil wells, commonly referred to as a "gamma ray log" is now used. The method involves traversing a bore hole with a radiation detector and charting the natural radioactive emission of various layers of rock with respect to depth. From such a chart, certain layers can be identified as shale, and such identification is significant in that, at the present time, it is believed that a shale layer is not a suitable reservoir for oil or gas.

However, as is apparent, some measurements in addition to those made by means of a gamma ray log must be obtained in order to identify a fluid reservoir. To obtain the additional information regarding the nature of subsurface formations, methods involving irradiation of the formations with neutrons have been commercially put in wide-spread use. Such methods are considered as belonging to the art of neutron well logging. Methods incorporating neutron irradiation and gamma ray detection are generally classified as "neutron-gamma-ray" log methods and methods incorporating neutron irradiation and neutron energy or density detection are generally classified as "neutron-neutron" log methods.

Information obtained with both methods is based on the underlying principles of nuclear collision. A nuclear collision is the interaction of a neutron with an atomic nucleus. Such interaction may be "elastic" or "inelastic." In an elastic collision the ordinary conservation laws are believed to apply. A portion of the energy of the striking neutron is transferred to the struck nucleus. If the target atom is heavy, the energy loss by the striking neutron, which is by comparison light, is small. If, however, the target atom is light, it will reduce materially the energy of a high-speed neutron. Thus, a centimeter of material right in a light element, such as hydrogen, will reduce the kinetic energy of an energetic neutron more effectively than the same thickness of a material rich in a heavier element. Consequently, a beam of neutrons is slowed down in a short distance in a material rich in a lighter element, and a comparatively long distance is required for the same velocity reduction by a material rich in a heavier element. It is thus apparent that elastic collisions account for neutron energy reduction. Inelastic collisions occur by virtue of this energy reduction. In an inelastic collision, an impinging neutron enters the nucleus of the struck atom, and unites with particles therein forming a new isotope of the bombarded element. Such neutron "capture" almost always occurs only with neutrons which have considerably less energy than they possessed upon exiting from a neutron source. Neutrons exiting from an ordinary neutron source are generally designated as "fast" neutrons while neutrons which have lost sufficient energy to participate in an inelastic collision are generally designated as "thermal" or "slow" neutrons. When a "thermal" neutron participates in an inelastic collision, the nucleus of the capturing atom is left in an excited state. The excess energy possessed by the capturing atom results in the emission from that atom of another particle or the emission of gamma radiation.

The principles of elastic and inelastic collision have generally been utilized in neutron-neutron and neutron-gamma ray log methods as follows: A source of fast neutrons is used to irradiate a substrata formation as suggested above, and a radiation detector is spaced from such source. The output of the detector is applied to a suitable recording instrument. If the material encountered by the neutrons in travelling from source to detector is rich in a lighter element, then the neutrons will be slowed down rapidly and captured in a short distance. The radiation resulting from capture will be, distance-wise, far from the detector, and as a result the recorded output of the detector will be small. If, however, the material encountered by the neutrons is rich in a heavier element, then the neutron has to travel greater distances before entering the thermal range necessary for capture. Distancewise, the capture will, in such case, occur near the detector and consequently the detector output will increase. In accordance with the same reasoning, if a detector is used that is sensitive to slow neutrons, the output of the detector would be greater when the neutrons had encountered a material rich in a heavier element than it would be when the material encountered was rich in a lighter element. Thus, if the substrata formations traversed by the neutrons travelling between source and detector contained water, a composition rich in hydrogen, the neutrons would be slowed down rapidly and captured near the source, and a spaced detector would have a decreased output. Of course, if a detector were used which was disposed near the source, such that it was responsive to at least part of the total capture radiation caused by the rapid slowing-down, then the output would increase when a formation containing fluid was adjacent and decerase when such was not the case. Regardless of disposition of source and detector, it is easily seen that if detector and source are moved within a bore hole, relative fluid content can be ascertained by the comparative activity of the detector.

The neutron-neutron and neutron-gamma ray logs afford an acceptable means of measuring, semi-quantitatively, the actual porosity of layers of the earth's crust since porous formations are usually filled with a fluid rich in hydrogen such as oil, gas, salt water, fresh water, or combinations thereof. However, it is apparent that these methods, like the gamma ray log, do not enable one to ascertain the exact fluids contained in a given reservoir.

Accordingly, the instant invention is directed to a method and apparatus which enables exact identification of the contents of a substrata reservoir. Radioactive methods based on the principles of nuclear collision and radioactive transformation have heretofore been suggested with regard to obtaining exact information as to the contents of such a reservoir; however, these methods have not involved the comparison of measurements which is the subject of this invention and which allows for convenient identification. The method utilizes certain levels of radiation having predetermined minimum energies which are characteristic of a particular fluid reservoir.

Accordingly, it is an object of this invention to provide a method of radioactive well logging which is based on a comparison of measurements of the levels of radiations having predetermined minimum energies.

It is another object of this invention to provide an entirely feasible method and apparatus for use in determining the presence of gas and oil in a substrata reservoir by radioactive means.

It is a further object of this invention to provide a method of exact identification which allows for use of apparatus or component parts thereof now commercially available.

It is a still further object of this invention to provide a method of exact identification which allows for use of apparatus which is readily adaptable to ordinary field conditions.

It is yet another object of this invention to provide an apparatus which may be used to carry out the invention even where severe temperature changes are encountered such as those present in a bore hole.

It is a still further object of this invention to provide such an apparatus which automatically adjusts itself upon temperature change and which may be carried in an exploration device of the type adapted to be moved through bore holes.

The method and apparatus provided by this invention for accomplishing the objects generally set forth above may be best understood when the following description is considered in connection with the annexed drawings. Other objects and advantages, will, at the same time, become apparent from such consideration.

FIGURE 1 is a side elevational view partly in section illustrating apparatus which may be used to carry out the invention, and the disposition of such apparatus relative to the strata to be examined;

FIGURE 2 is an exemplary diagram of measurements made with reference to an oil reservoir in accordance with the provisions of the preferred embodiment of this invention;

FIGURE 3 is a similar diagram to FIGURE 2, but is illustrative of measurements made with reference to another type of reservoir;

FIGURE 4 is a similar diagram to FIGURE 2, but is illustrative of measurements made with reference to still another type of reservoir;

FIGURE 5 is a similar view to FIGURE 2, but is illustrative of measurements made with reference to a gas reservoir;

FIGURE 6 is a vertical cross-sectional view of an exploratory unit provided by this invention;

Figure 10:
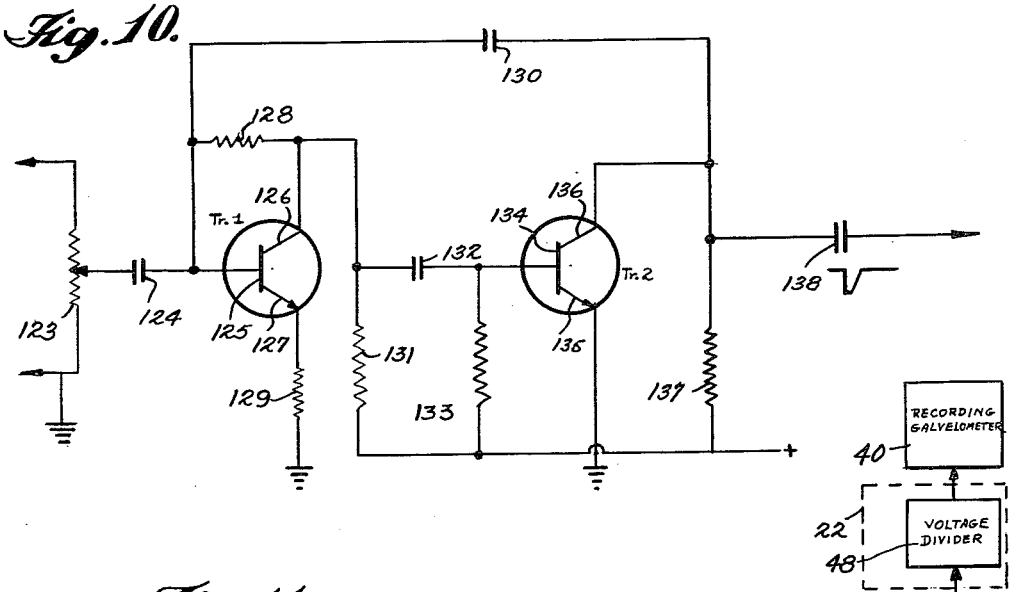
Figure 11:
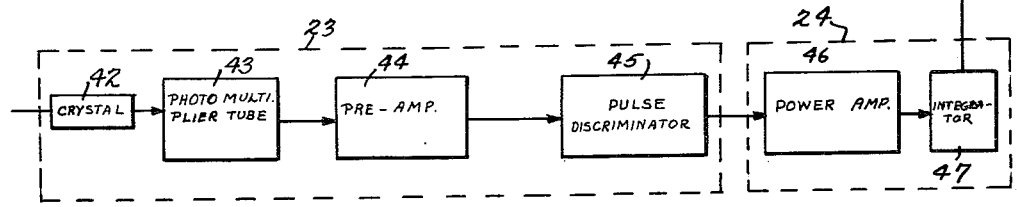
Figure 12:
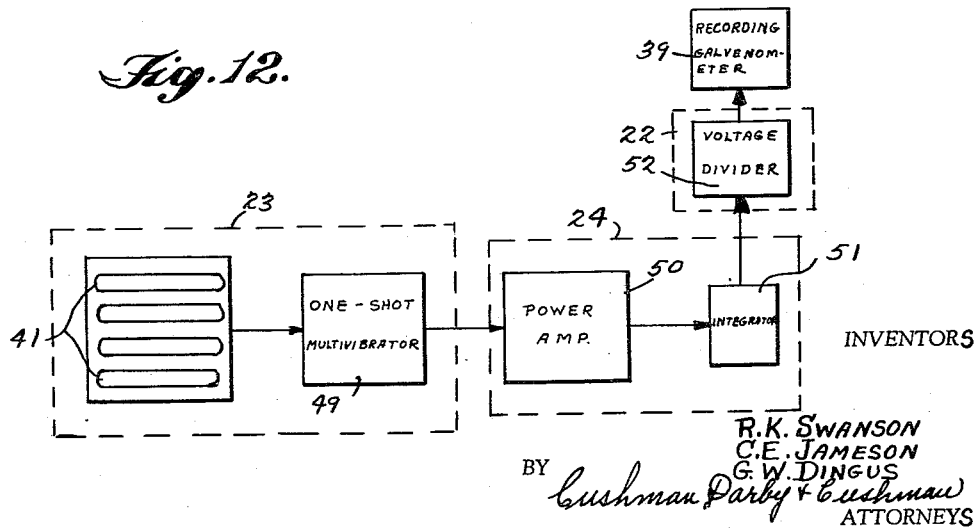
Figure 13:
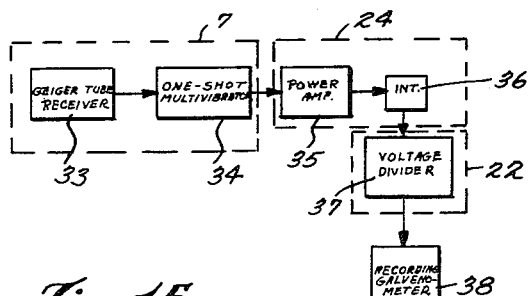
Figure 14:
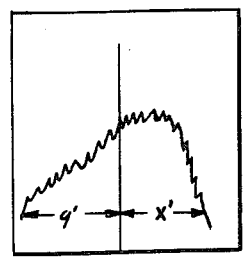
Figure 15:
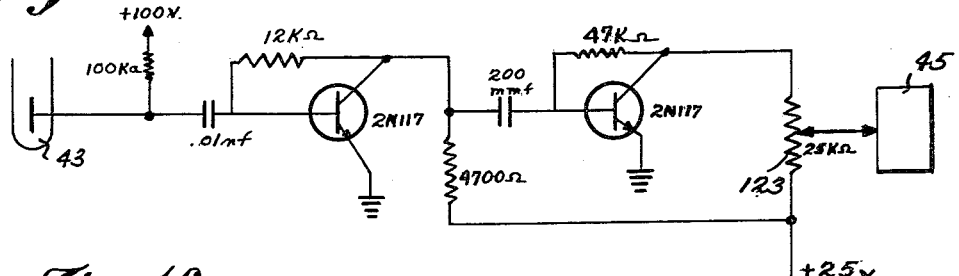
Figure 16:
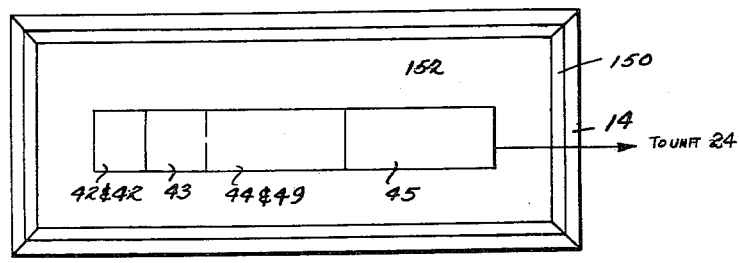
Figure 20:
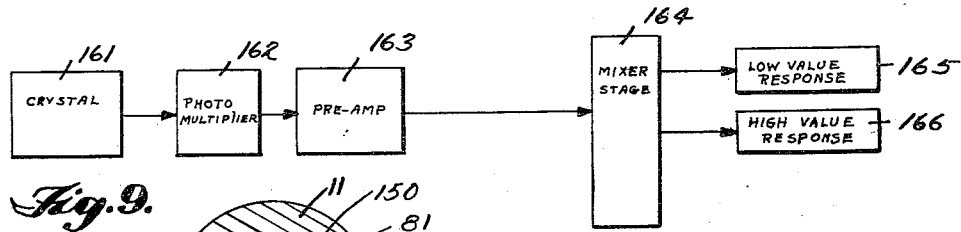
Figure 9:
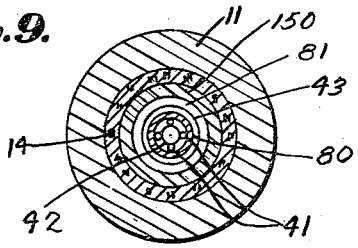
Figure 17:
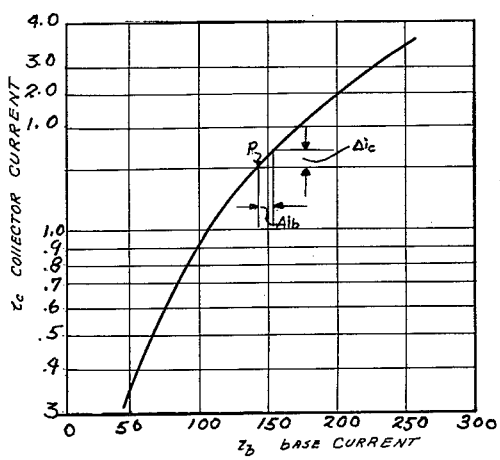
Figure 18:
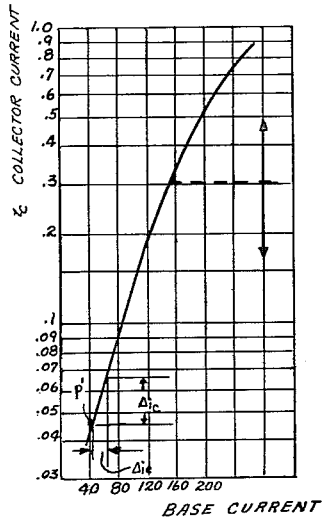
Figure 19:
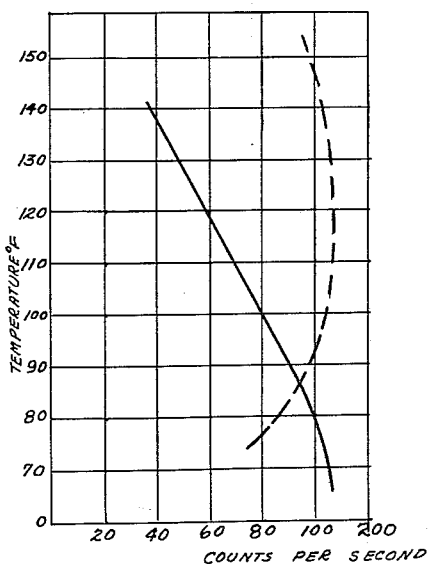

FIGURE 7 presents a pair of actual logs made in accordance with the preferred embodiments of this invention;

FIGURE 8 is a gamma ray log made of the same formations as the logs presented in FIGURE 7;

FIGURE 9 is a cross-section view taken on the line 9—9 of FIGURE 6;

FIGURE 10 is a circuit diagram of a pulse discriminating unit provided by this invention;

FIGURE 11 is a block diagram of the circuitry associated with one detector as used in accordance with this invention;

FIGURE 12 is a block diagram of the circuitry which may be associated with another detector as used in accordance with this invention;

FIGURE 13 is a block diagram of the circuitry which may be associated with still another detector as used in accordance with this invention;

FIGURE 14 is an illustrative curve of radiation received by a detector in accordance with this invention when such detector passes adjacent a fluid reservoir of a particular type or of particular types;

FIGURE 15 is a circuit diagram of a preamplifier which may be associated with a detector as provided by this invention;

FIGURE 16 is a cross-sectional view of a detecting unit potted in a meltable material as provided by this invention;

FIGURE 17 is a dynamic characteristic curve representative of operation of a part of the circuit of FIGURE 10;

FIGURE 18 is a dynamic characteristic curve representative of operation of another part of the circuit of FIGURE 10;

FIGURE 19 is a plot of temperature effects on continuations of components of a detecting unit; and FIGURE 20 is a block diagram of the circuitry associated with a detecting unit provided in a modification of apparatus of this invention.

In FIGURE 1 is shown a series of layers of rock 1, 2 and 3 which have been traversed by a bore hole generally designated as 4. These layers are being irradiated by neutrons exiting from a neutron source compartment 5 of an exploring apparatus 10. These neutrons participate in elastic and inelastic collisions with the atoms contained in the various layers. The secondary radiation resulting from bombardment by the primary radiation in the form of neutrons from the source is detected by a radiation detector in compartment 6.

The detector is not sensitive to the rather weak energy natural radiation exiting from the layers, but is sensitive to all of the more energetic "capture" secondary radiation. The detector and source are shown in one position as they are being lowered into a bore hole, adjacent a substrata layer 2 which contains a fluid reservoir generally designated by the numeral 9. As the detector comes within range of the fluid reservoir 9, the output of the detector increases because it is disposed near enough to the source to detect at least part of the capture radiation resulting from neutron captures. Any of the types of fluid which may be contained therein, namely, salt water, oil, gas, fresh water, or combinations thereof, are rich in a lighter element, hydrogen, and consequently neutrons which have passed from the source into the formation are effectively slowed down, have decreased their energy such that they are within the thermal range, and capable of participating in inelastic collisions. Inelastic collisions occurring in the vicinity of the detector result in emission of secondary radiation which is incident upon the detector within compartment 6 referred to hereinabove. The output of the detector for varying natures of reservoir 9 may be considered with reference to FIGURES 2, 3 and 4 wherein several exemplary reservoirs and output curves are shown for setting forth the theory believed to underly this invention.

In FIGURE 2(b) is shown the output of the detector when the reservoir contains a mixture of oil and salt water such as may be found in a common oil reservoir. As stated above, thermal neutrons ready to participate in an inelastic collision are in the reservoir as a result of the irradiation by the source and slowing down by the hydrogen molecules. Elements which are found in sedimentary rocks in more than trace quantities, and which therefore could capture one of the slow neutrons, include in addition to hydrogen, chlorine, sulfur, sodium, calcium, silicon, carbon and oxygen. The affinity of the elements to capture a slow neutron is indicated by its neutron cross-section. The cross-sections of these elements are approximately as follows:

| | |
|---|---|
| Chlorine | 32.0 |
| Sulfur | .49 |
| Sodium | .47 |
| Calcium | .42 |
| Hydrogen | .33 |
| Silicon | .13 |
| Carbon | .0047 |
| Oxygen | .0012 |

All, or any one of these elements may capture a slow neutron, and upon such capture will emit gamma radiation which may fall upon the detector and result in an increased output. It is seen from the relative cross-section values that chlorine has a very high affinity for neutrons and therefore could be expected to account for a relatively large percentage of the total secondary radiation exiting from the formation. By reference to FIGURE 2(a) it will also be seen that the reservoir disclosed in that figure contains all salt water, and therefore a higher chlorine content, below the water table line than it does above that line. Because of this, when the detector passes adjacent the top of the reservoir, its output will increase to a value represented by $a$ in FIGURE 2(b); however, when the detector reaches a point adjacent the lower level of the reservoir, its output will further increase to a value represented by $b$ because of the increased chlorine content and resultant increase in capture radiation. As a result of the increased capture radiation the output curve of the detector is step-like under these conditions.

In FIGURE 3(b) is shown the output of the detector as it passes adjacent a rservoir which contains all salt water. It will be noted that there is no step-like increase, as could be expected because there is no change in content of any of the constituent elements.

In FIGURE 4(b) is shown the output of the detector as it passes adjacent a reservoir which is more porous at the bottom than at the top and which contains all salt water. It will be noted that the output curve is step-like and similar to that obtained when a reservoir of unchanging porosity contains oil and salt water. Of course, the step-like output could be expected because of the changing hydrogen and chlorine contents.

With the ideal reservoirs assumed above to illusrate the output of the detectors, a difference between the curves of FIGURE 2(b) and FIGURE 4(b) appears; however, under ordinary field conditions such difference could not be expected because the reservoirs are not limited to the relative sizes and shapes presented. It is apparent, therefore, that by using one detector, oil and gas reservoirs cannot be identified with certainty.

*Method*

For this reason, according to the preferred embodiment of the method of this invention, a second detector is provided which is so disposed with reference to the first, that the two have essentially the same field of detection. The first detector which has been discussed above, will hereinafter be referred to as the "full spectrum detector" since it is set to detect all secondary radiation exiting from the formation having an energy greater than the energy of the natural radioactivity-photons. The second detector will be referred to hereinafter as the selective detector because it is adjusted in such a manner that it will only detect certain energy above the natural level— not all energy above that level.

The method of this invention is believed to be based on the characteristic behavior of a nucleus upon capture of a neutron. The degree of excitation of a compound nucleus depends upon the identity of the original nucleus that captured the neutron. Hydrogen upon the neutron capture produces a compound nucleus having an excitation energy of about 2.3 mev. and emits a single photon upon being excited, which photon has that energy. However, all compound nuclei do not lose the energy resulting from neutron capture in the same way. In the case of a heavy nucleus, the excitation energy may be lost in a single step or it may be lost in the form of several quanta emitted simultaneously. In order to consider the behavior of a heavy nucleus not having a one-step decay, take an exemplary atom which has a nucleus that upon capture of a neutron has an excitation energy of 7 mev. This compound nucleus may decay first to an intermediate energy state wherein the nucleus has an excitation energy of 4 mev., and, as a result, a gamma ray of 3 mev. energy emerges from the atom. Subsequently, the nucleus may decay further to an energy state wherein it has an excitation energy of 0 mev. and as a result a photon emerges having an energy of 4 mev. The process may result in any series of photons of different energies and it should be understood that this example is only presented for illustrative purposes. However, it is known that if the photons which result from such decays are detected, one may obtain for each element a decay spectrum. The spectrum is indicative of the atom having such a decaying nucleus. For purposes of this invention it is important to note that the prominent photon energies resulting from chlorine decay are between 3.5 and 7.0 mev., and the photons resulting from hydrogen captures have an energy of approximately 2.3 mev.

Because of the fact that chlorine photons resulting from a decay subsequent to capture have an energy greater than those of photons resulting from hydrogen decays subsequent to capture, the second detector, the selective detector, is, according to this invention, responsive only to photons having an energy above those resulting from hydrogen capture, that is, above 2.3 mev.

The output of the selective detector may be studied by reference to FIGURE 2(c) wherein the output of this detector is shown when it passes the same reservoirs as passed by the full spectrum detector in the above discussion. As the detector passes adjacent the top of the reservoir, its output increases to a value represented by $a'$ primarily because of the chlorine captures which result from the presence of slow neutrons made available by hydrogen molecules. As the detector passes to the lower part of the reservoir, the output increases because of the increased chlorine content. The output curve is step-like and similar to that of the output of the full spectrum detector. The output curve of the selective detector is shown in FIGURES 3(c) and 4(c) when the detector passes an equal porosity reservoir containing all salt water, and when the detector passes a reservoir of changing porosity containing all salt water.

Although the selective detector curves in all three instances appear to have the same shape as the full spectrum detector curves, an essential difference exists which is the basis of this invention. Because oil is known to contain more hydrogen per unit volume than salt water, the top of the reservoir of FIGURE 2 contains more hydrogen per unit volume than does the bottom.

Since the hydrogen content is less at the bottom of the reservoir than at the top, there are less slow neutrons captured near the source at the bottom and therefore there are more slow neutrons available in the vicinity of the detectors. The hydrogen capture radiation at the bottom may be less than it was at the top, however, because there are less hydrogen atoms present to participate in capture. The output of the full spectrum detector, which is dependent upon all capture radiation, increases at the bottom because of the presence of many more chlorine atoms. The radiation resulting from chlorine captures at the bottom is not proportional to the increased number of available chlorine atoms present at the bottom only because there are more slow neutrons available in the vicinity of the source. As a result, the full spectrum detector when passing adjacent the bottom of the reservoir shows an increased output. This increase may, however, be offset to some extent because of the decreased number of radiations attributable to hydrogen captures. Of course, the radiation resulting from capture by other elements present is increased because of the increased number of slow neutrons available in the vicinity of the source.

Since the selective detector is not responsive to radiation resulting from hydrogen capture, its output is not affected in exactly the same way as the output of the full spectrum detector. The output of the selective detector increases and is affected by the increased number of slow neutrons available and increased chlorine content. It is not subject to the possible effect connected with the hydrogen capture.

Now, consider the relative changes in output of the two detectors when they pass from a position adjacent the top of the reservoir to a position adjacent the bottom of the reservoir. If there is no change in hydrogen capture because the increased number of slow neutrons overcomes the effect of decrease in hydrogen atoms, the percentage change in output of the full spectrum detector is equal to the changes in chlorine capture radiation divided by the total radiation detected at the bottom of the reservoir multiplied by 100%. If the change in hydrogen content had a decreasing effect on radiation detected by the full spectrum detector, then the percentage change would be less. The percentage change in output of the selective detector is essentially equal to the change in chlorine capture radiation divided by the total selected radiation at the bottom multiplied by 100%. Since the radiation detected by the full spectrum detector is always more than the radiation attributable only to chlorine captures, and since the increase in output of both detectors is attributable essentially to chlorine captures the change in output of the selective detector is greater percentagewise than the change in output of the full spectrum detector.

The relationship between changes in output may be expressed as follows, when reference is made to FIGURES 2(b) and 2(c):

Full spectrum detector:

$$\frac{b-a}{a}=c\%$$

Selective detector:

$$\frac{b'-a'}{b'}=c'\%$$

$$c'\% > c\%$$

Such a percentage difference in changes in output is not experienced when the detectors pass adjacent a reservoir containing salt water, even where there is a difference in porosity because the hydrogen and chlorine contents increase and decrease proportionately. In such reservoirs, there is no variation in hydrogen content without a corresponding variation in chlorine content. For this reason, such a difference in percentage change in output is indicative of the presence of oil in a reservoir.

In order to use the differences of percentage change advantageously, this invention provides for setting the outputs of the detectors equal when the detectors are adjacent a salt water reservoir. This would mean that in FIGURE 2, the bottom step of the curve in (b) would be set to coincide with the bottom step of the curve in (c). After such normalization when the detectors passed adjacent the oil bearing portion of the reservoir their outputs would decrease, but the decrease in the full spectrum detector's output would be less than the decrease in the output of the selective detector for the reasons stated above, and hence the top step of the curves would not coincide. Such a relation is shown in FIGURE 2(c) wherein it will be noted that there is an area of non-coincidence of the curves, the output of the full spectrum detector appearing greater than the output of the selective detector. The relationships between outputs when the detectors pass the other exemplary reservoirs which contain salt water are shown in FIGURE 3(d) and FIGURE 4(d).

The above discussion has been based solely on the principle that the amount of gamma radiation produced by an element is proportional to the number of neutrons captured per unit time by the element which depends on the number of neutrons available and the capture cross-section of the element. In the reservoirs considered, there were many more hydrogen atoms than any other type. At the same time, chlorine has by far the largest cross-section. Although other elements are present they are not present in as nearly as great a quantity as hydrogen, and they have cross-sections which are very much smaller than that of chlorine. Moreover, there is no significant change in amounts of other elements contained in different portions of the reservoir, and for this reason their effect on each detector's output have been ignored for purposes of this discussion.

FIGURE 5 shows the relationship between the curves where gas and salt water are found in a reservoir. If there is a mixture of gas and salt water above the water table line, then the relationship between outputs of the detectors may be analyzed in exactly the same way as the oil and salt water reservoir was analyzed. Since gas contains less hydrogen per unit volume than salt water, there is a greater hydrogen content below the water table line than there is above the water table line. Since such is the case there are less slow neutrons available in the vicinity of the detector at the bottom of the reservoir than there are at the top. This has the same decreasing effect on the outputs of both detectors when adjacent the bottom.

The effect of changes in hydrogen and chlorine content, however, is not the same on both detectors. The output of the full spectrum detector is increased when the detector passes from adjacent the top to adjacent the bottom of the reservoir as a result of the increase in hydrogen capture radiation and increase in chlorine capture-radiation which is occasioned by the increased hydrogen and chlorine content at the bottom of the reservoir. At the same time, the selective detector's output is only increased by the increase in chlorine capture radiation.

Since there is a combined increase in radiation incident upon the full spectrum detector, and since the full spectrum detector's output is attributable primarily to chlorine capture radiation, especially when the detector is adjacent the top of the reservoir, it follows that the increase in the full spectrum detector output is greater percentagewise than the increase in the partial spectrum detector output.

The relationship between changes in outputs in a gas zone may be expressed as follows when reference is had to FIGURES 5(b) and 5(c).

Full spectrum detector:

$$\frac{b''-a''}{b''}=c''\%$$

Partial spectrum detector:

$$\frac{b'''-a'''}{b'''}=c'''\%$$

$$c'''\% < c''\%$$

It will be noted that the relationship between output percentage changes is exactly the reverse in a gas zone to that experienced in an oil zone; that is, the percentage change in output of the full spectrum detector is less in an oil zone than the percentage change in output of the selective detector, but in a gas zone the percentage change in the output of the full spectrum detector is more than the percentage change in output of the selective detector. For this reason it is possible to distinguish oil zones from gas zones, as well as to distinguish an oil or gas zone from a salt water reservoir, by normalizing the outputs when the detectors are adjacent a salt water reservoir. After such normalization, there is no area of non-coincidence between outputs when the detectors pass adjacent a salt water reservoir; however, when the detectors pass adjacent a gas or oil reservoir there is an area of non-coincidence of outputs because in such zones the relative changes in hydrogen and chlorine content are not proportional to one another. When the detectors are adjacent a gas reservoir the output of the selective detector appears greater than the output of the full spectrum detector, whereas when the detectors are adjacent an oil reservoir, the output of the selective detector appears to be less than the output of the full spectrum detector. Although reservoirs having exposed water tables have been presented, the method is not limited to use therewith because normalization may be made adjacent any salt water reservoir, and subsequent passage of the detectors adjacent any oil or gas reservoir results in the areas of non-coincidence between outputs. The relative sizes of the normalizing reservoir and gas or oil reservoir do not affect the occurrence of areas of non-coincidence and the relationships between outputs.

It has been found, that in some instances, the outputs of the detectors actually decrease when passing from a gas to a salt water zone which are apparently of approximately the same volumes. Although no satisfactory explanation has thus far been developed, it is believed that this phenomenon is caused by radiation resulting from an inelastic scattering process, or by the effect of the decrease in available slow neutrons near the detectors. It should be noted, however, that the deviation between outputs in such a zone after normalization still occurs and as a result gas may be identified even under such circumstances.

Fresh water may be distinguished from oil and gas because there is no significant increase in the output of the selective detector which corresponds to an increase in the output of the full spectrum detector. Moreover, the outputs in such a situation are at a comparatively low level because there are no chlorine captures. Moreover, there is no changing content of constituent elements, unless there is change in porosity.

It should be understood that the curves presented in FIGURES 2 through 5 are not intended to be drawn to scale. They have been presented in connection with an ideal reservoir, which has a water table at its middle for exemplary purposes only, to show the phenomena experienced in passing different types of reservoirs.

Reference should be made in FIGURE 7 wherein a set of actual logs made in accordance with the method of this invention are presented. The solid line curve in this figure represents the output of the full spectrum detector, and the dashed line curve represents the output of the selective detector. The output of the detectors was normalized adjacent salt water reservoir before making the logs. Consider the area of the curves between 3220 feet and 3240 feet. It will be noted that in this area the output of both detectors was increased and there is a deviation in outputs. The output of the selective detector appears greater than the output of the full spectrum detector. Accordingly, the area can be expected to contain gas. Now, consider the area of the curve between 2400 and 2900 feet. Here the output of the full spectrum detector appears greater than the output of the selective detector. As a result, it can be expected that oil is present in this zone.

Now, consider the part of the logs taken at 3250 feet. It will be that at this point the full spectrum detector's output appears to be less than that of the selective detector. The output of the detectors is not, however, at an increased level; that is, the level of the output is comparatively low. This low level indicates that the formation is not porous, but the departure in the curves indicates that gas is present. It could be assumed that in such a situation, something other than gas is responsible for such a phenomenon; however, to be certain that the formation is not porous at that point or capable of serving as a gas reservoir, another log can be run in conjunction with those shown in FIGURE 7. This other log, an ordinary gamma ray log, representative of the natural gamma radiation exiting from the formation, is shown in FIGURE 8. The gamma ray log is aligned with those of FIGURE 7 so that corresponding outputs may be considered at different depths.

As was pointed out hereinabove, the gamma ray log enables identification of shale layers; that is, an increased output of a natural gamma radiation detector is indicative of the presence of naturally radioactive materials and shale contains more of such materials than other sedimentary formations. Also, as pointed out above, a shale layer is not believed to be a satisfactory reservoir for oil or gas. It will be noted that at 3250 feet the output of the natural gamma radiation detector is at an increased level compared to the level of output adjacent the gas reservoir considered to exit between 3220 and 3240 feet. In accordance with this information, it is apparent that oil is not present in the layer at 3250 feet.

From the foregoing discussion with regard to the information obtained from an actual series of logs, it will be seen that oil and gas reservoirs may be identified by the departure in the output of the two instruments. When a departure in outputs occurs adjacent a layer which could not serve as an oil reservoir, then the outputs of the detectors drop to a lower level. For purposes of exactness, however, the output of a natural radiation detector may be compared to that of the full spectrum and selective detectors so that certain layers may be definitely identified as shale and thereby eliminated from consideration. The identification of shale is also important because at least the bottom surface of an oil or gas reservoir is usually shale, and therefore even more definite information is obtained, although such information is not essential to identification made in accordance with this method.

Additional information may be obtained with the methods of this invention although no reference has been made thereto above. The method also yields information as to the relative amounts of fluid present in certain instances. When a reservoir having an exposed water table is encountered, the curve under fixed conditions may have a general shape such as that shown in FIGURE 14. The length $y'$ is indicative of the presence of an oil or gas mixture while the length $x'$ is indicative of the presence of all salt water. The curve is found to slope on the left side because of the increasing salt water content found to exist in oil and gas mixtures with increasing depth in the reservoir. Accordingly, where an exposed water table is found, the lengths of relative portions of the curve are indicative of the relative amounts of oil and gas mixture. This factor may be considered with a level of output to determine relative quantities of oil or gas in substrata formations.

*Apparatus*

A complete general apparatus which may be used to carry out the invention is shown in FIGURE 1 wherein there is schematically illustrated a bore hole 4 penetrating the formation to be explored. The bore hole is defined in the conventional manner by a tubular metallic casing designated as 4'.

For the purpose of exploring the formation along the bore hole there is provided an exploratory apparatus 10 comprising a housing 11 which is lowered into the bore hole 4 by means of a cable 12 including as a part thereof suitable insulating conductors. The cable 12 has a length somewhat in excess of the depth of the bore hole to be explored and is normally wound on a drum 13 positioned above the bore hole opening. The cable 12 may be unwound from the drum 13 to lower the exploring apparatus into the bore hole 4 and may be rewound upon the drum 13 to raise the exploring apparatus.

In order to determine the depth of the exploratory apparatus within the bore hole 4, there is provided a measuring reel 14 engaging the cable 12 above the bore hole and adjusted to roll on the cable in such a manner that the number of revolutions of the reel 14 corresponds to the amount of cable that has been moved past the reel in either direction. The reel 14 is connected through a driving link 15 to spool 18 which is the take-up spool for moving charts 50, 51 and 52 from a feed roll 19. The link 15 may be a gear connection or may comprise a set of synchronous motors. Disposed above the charts are three recording galvanometers 38, 39 and 40. These recording galvanometer are fed with inputs coming through leads 38', 39' and 40' from a control panel 22 which receives electrical information from the exploring apparatus via cable 12.

The system used for positioning the exploration apparatus and recording signals therefrom may be of any type well known to those of ordinary skill in the art. The system shown in FIGURE 1 is presented for illustrative purposes only.

The exploratory unit provided for carrying out the method suggested hereinabove is shown in cross-section in FIGURE 6. Within the housing 11 are disposed a special detecting unit 23, a detector 7, and a power unit 24. A shielding tube 25, within which is disposed a neutron source 26, is joined to one end of the housing 11 by means of screw threads 27' which cooperate with a threaded bore 27 carried by the housing. The special detecting unit 23 is disposed above the threaded bore 27 and comprises two detectors, namely, a full spectrum detector and a selective detector disposed within a container 150. Disposed above the special detecting unit 23 is a power unit 24 which comprises power supplies for the various detectors as well as output power circuitry associated with each detector. Disposed above the power unit 24 is a detector 7. Above detector 7 is a threaded bore 28 which cooperates with a threaded extension 29 carried by cable coupling 30. An insulation 14, shown as cork, surrounds the special defecting unit 23, the power unit 24 and the detector. However, any or all of these components may be insulated by a vacuum jacket, or may not be insulated at all. The insulation frictionally engages the inner walls of housing 11, thereby holding the components in position. Any other suitable means may be employed for securing purposes.

The spacing between the source 26 and detector 7 must be such that detector 7 is substantially unaffected by capture gamma radiation because the detector 7 is only to be responsive to natural radiation. The spacing between the source and special detecting unit 23 must only be such that the unit pass adjacent a reservoir during the time that capture radiation is occurring to some significant extent.

Particular attention will now be directed to the individual components of the exploration apparatus.

Source

The source 26 may be any one of a number of substances which produce fast neutrons. It has been found preferable to use a radium-beryllium source of the type now commercially available; however, a polonium-beryllium, actinium-beryllium, or any other type of source using natural or artificial means of generating fast neutrons may be used without limiting the success which may be achieved with this apparatus. It is significant to note that the source need not be monoenergetic even though a monoenergetic source may be used.

Shielding

The shielding tube 25 which encases the source consists of a jacket 32 surrounding a block 31 which is made of a high density material such as lead or tungsten. The tube and block have an aperture (not shown) in one side through which fast neutrons produced by source 26 may exit without interference traveling in a generally horizontal direction. When a high gamma-emission source is used such as radium-beryllium the shielding is necessary to prevent masking of the detectors by the source gamma radiation. When a low gamma radiation source is used, the heavy shielding material is not required because there would then be no danger of source radiation masking the detector.

Natural Radiation Detector

The natural radiation detector 7 includes a receiver 33 and a conventional one-shot multivibrator 34. The receiver may be any one of the well-known Geiger-Muller type receivers now used in radioactivity well loggings, or it may be a scintillation crystal-photo-multiplier unit type receiver of any well-known type. In the preferred embodiment a Geiger-Muller type receiver is employed.

With reference to FIGURE 13 it will be seen that the output of the Geiger tube receiver 33 is used to trigger a one-shot multivibrator 34, and that the output of the multivibrator is fed to a power amplifier 35 which feeds integrating circuit 36. As a result of the amplification and integration a signal of sufficient strength is fed to a voltage divider 37 on the surface housed within panel 22 (FIG. 1). This voltage divider serves as an adjustment of the signal fed to recording galvanometer 38. The power amplifier 35 and integrator 36 are disposed within the power compartment 24 (FIG. 1). The power amplifier is operated as a class C amplifier so that maximum output without distortion may be achieved. The circuitry associated with the natural radiation detector is conventional and need not be of the form shown. Any suitable means may be used to detect and record the level of natural radiation.

The Special Detecting Unit

The special detecting unit, as stated hereinabove, comprises a full spectrum detector and a selective detector. The receiver of the selective detector as best shown in FIGURE 9 is a scintillation crystal 42. The receiver of the full spectrum detector comprises a plurality of pencil-type Geiger-Muller tubes 41 of the kinds commercially available. These tubes are disposed around the circumference of the scintillation crystal and are secured to the crystal in any suitable manner, such as cementing material. This arrangement provides for both detectors having the same detection field, and such an arrangement has been found preferable; however, it should be understood that the detectors need not be so arranged for successful practice of this invention.

The circuitry associated with the full spectrum detector's receiving tubes is shown in FIGURE 13. The receiving tubes are connected in parallel. It will be seen that this circuitry is essentially the same as that associated with the natural radiation detector 7, and each component of the circuit functions in the same way as the corresponding component of the natural radiation detector circuitry. The component parts are contained within dash line boxes 22, 23 and 24, these boxes being indicative of the disposition of the elements during operation under the preferred embodiment.

A thin shielding ring 80 (FIG. 9) surrounds both receivers and frictionally engages the pencil Geiger tubes. The shield may be made of any of the suitable materials, well known to those in art, that allows for shielding the detectors from low energy gamma radiation resulting from natural transformations. The shielding may surround all of unit 23, any part thereof, or be disposed in any other suitable manner for performing the shielding function.

The receiver 42 of the selective detector is a scintillation crystal. For purposes of present convenience, and commercial availability only, it is preferable to use a sodium iodide crystal activated by thallium for the scintillator. Such a crystal has a high density, a high efficiency for the detection of gamma radiation, and is easily handled. For purposes of this apparatus, however, it is only necessary that the receiver used have an output proportional to the energy of a gamma ray photon received. A crystal of the above type emits a photon of light energy when a gamma ray photon impinges upon it, and the energy of the light photon is proportional to that of the incoming gamma ray photon.

The light emitted by any scintillator, now available, regardless of type, is very feeble and must be amplified in order to account for a detectable perimeter. To accomplish such amplification, a photo multiplier tube 43 is incorporated. Photo multiplier tubes are available in a variety of types, but almost any type may be used for the purpose stated. The output of the photo multiplier tube is applied to the input of a preamplifier, such as the one generally designated by the numeral 44 (FIG. 11). This preamplifier may be of any conventional design, but the circuit shown in FIGURE 15 has been found preferable. The output of the preamplifier is fed to the input of the pulse discriminating circuit 45. The output of the pulse discriminating circuit is fed to a class C amplifier, the output of the amplifier 46 is fed to an integrator 47, and the output of the integrator is fed to a voltage divider 48 above the surface and then to the recording galvanometer 40. The components have again been shown in dashed boxes representative of the respective disposition. The photomultiplier tube 43 plugs into a socket 81 which is carried by a chassis 82. Disposed on the chassis are the components of the two detector circuits within unit 23 aside from the receivers and photomultiplier tube.

The selective detector is used to measure the level of gamma radiations resulting from capture having energies above the energy of those gamma radiations resulting from hydrogen capture and for this reason a suitable circuit responsive to only certain energy levels must be associated with this detector. Such a circuit is shown in FIGURE 10.

The numeral 123 designates a voltage dividing unit in the output circuit of preamplifier 44 which may be of the type shown in FIGURE 15. The top on the voltage dividing unit is connected through capacitance 124 to the base 125 of Tr.1. The emitter 127 of Tr.1 is connected through emitter bias resistor 129 to ground potential. The collector 126 transistor Tr.1 is collected through load resistor 131 to a source of positive potential generally designated as (+). A resistance 128 is connected between collector 126 and base 125 and serves as a base biasing resistor. Between the base biasing resistor 128 and collector load resistor 131 is connected one side of a capacitor 132. The other side of capacitor 132 is connected to the base 134 of transistor Tr.2. A resistance 133 is connected between base 134 and the source of positive potential. The emitter 135 of Tr.2 is grounded. Connected between collector 136 of Tr.2 and the source of positive potential is collector load resistance 137. A feed back loop comprising capacitance 130 is connected between the collector 136 of Tr.2 and the base 125 of Tr.1. This feed back loop serves to feed a portion of the output of transistor Tr.2 back to the base of transistor Tr.1. The values of the components may be selected in any manner well known to those skilled in the art. The values of load resistances 131 and 137 are chosen such that transistor Tr.1 draws a relatively high collector current whereas transistor Tr.2 draws a relatively low collector current. Of course, the bias resistor 128 must be chosen in accordance with these conditions so that a suitable bias is maintained between collector 126 and base 125, and resistor 129 must suitably bias the emitter 127 for maintaining the aforesaid condition.

In operation, negative current pulses from the preamplifier 44 are applied across a voltage dividing unit 123. From the tap on the voltage divider the pulses are fed to the base of transistor Tr.1. Since the transistor is operated in initial state, such that it draws a relatively heavy collector current through resistor 131, when the negative pulse is applied to base 125, the current drawn by the transistor through resistor 131 decreases. This results in a voltage increase at the collector 126, and as a result a positive current pulse is applied through capacitor 132 to the base of transistor Tr.2. In its initial state, as stated above, transistor Tr.2 is operated such that it is conducting a very low current because its collector load resistance 137 is very high. The positive pulse applied at the base of Tr.2 resulting from the decreased conduction of Tr.1 causes an increase in current output of transistor Tr.2 and a resultant decrease in the collector voltage because of the increased IR drop across resistor 137. A portion of this negative pulse resulting from the increased IR drop across resistance 137 is fed back to the base 125 of Tr.1 through capacitor 130. This feed back pulse reinforces the original pulse, driving transistor Tr.1 into a further state of reduced current. The entire process pyramids until transistor Tr.1 is cutoff and transistor Tr.2 is conducting at saturation. The final output pulse at the collector of Tr.2 is thus relatively large having an amplitude approximately equal to the supply voltage for each pulse capable of triggering the circuit.

Of course, the amplitude of the input pulse must be sufficient to cause the necessary changes in collector currents which initially cause triggering of the circuit. The voltage divider 23 is provided with a tap which may be adjusted such that any minimum amplitude pulse output from the preamplifier is required for the triggering. According to the preferred embodiment of the invention, it is set such that triggering of the circuit only occurs when a gamma ray photon having an energy above 2.3 mev. impinges upon crystal 42.

The time required for the pulse discriminating circuit to return to its initial condition after generating each output pulse at a time depends on the time constant of resistance 133 and capacitance 132. During the production of an output pulse, the circuit is not sensitive to an input pulse; however, this factor does not limit utility because the period of insensitivity is short and all periods of insensitivity are equal.

From the foregoing discussion with regard to FIGURE 10, it will be apparent that a pulse discriminating circuit has been provided which when coupled to a scintillation crystal-photo-multiplier-preamplifier unit, provides an output only when gamma ray photons having a certain energy are incident upon the crystal.

Power units in the form of batteries are carried within compartment 24 (FIG. 10) for supplying all circuits and components thereof with the necessary potentials.

Operation in accordance with the preferred embodiment of the invention is as follows: When natural radiation is incident upon receiver 33, a signal is fed, by means of the circuitry of FIGURE 13, to recording galvanometer 38. The galvanometer records on chart 50 a line which varies in accordance with the radiation received. Since roll 18 moves the chart in accordance with the amount of cable unwound from drum 13, the level of radiation is recorded with respect to depth.

When capture radiation is incident upon receivers 41, a signal is fed, by means of the circuitry of FIGURE 12, to recording galvanometer 39. The galvanometer records on chart 51 a level of radiation received. This record is also made in accordance with depth since chart 51 is controlled by roll 18. Charts 50 and 51 are set at different depth levels initially so as to compensate for their different depths occasioned by their depositions within the exploratory apparatus.

When capture radiation is incident upon receiver 42, recording galvanometer 40 produces a record of radiation received in accordance with the characteristics of the circuit of FIGURE 11. This record is indicative of all capture radiation occurring from captures which result in photons being emitted having an energy greater than 2.3 mev.

The adjustment of voltage divider 123 is made when the exploratory unit is outside the bore hole. The deflections of the recording galvanometers are initially set by adjustment of voltage dividers 37, 41 and 48. The levels of deflection of recording galvanometers 39 and 40 are set equal when the detectors are adjacent a salt water reservoir.

After the initial adjustments have been made, the detector is lowered through a bore hole, or raised, and the charts of the radiation incident upon each detector are made. After the charts are completed, the chart 52 is traced upon chart 51 and chart 50 is aligned with the tracing of chart 52 and chart 51. This final step of tracing and aligning allows for the comparison of outputs which is used for identification in accordance with the method set forth hereinabove. It should be understood that suitable apparatus may be used which records charts 51 and 52 simultaneously, in which case there would be no need for the tracing step.

Although the apparatus provided hereinabove is satisfactory for practicing the invention, some components may not function properly if a change in temperature is encountered. In particular, the level of the output from the photo multiplier tube particularly decreases, with increasing temperature. The relationship between output and temperature is shown by the solid line curve in FIGURE 19. Since this photo multiplier-crystal unit is only responsible, according to this invention, for producing an output when a relatively high energy quanta impinges uopn it, the decrease in total output counts per second received from the unit with increasing temperature is not a serious limitation because the unit will still produce a pulse when bombarded by stronger gamma rays of the type resulting from neutron capture. The output pulse will, however, have less energy than one produced by a gamma ray of the same energy when the crystal photo multiplier unit is at a lower temperature.

Because the selective detector must be sensitive to the energy level of the impinging gamma rays, the circuitry associated with that detector must compensate for the reduced output pulse level occasioned by an increased temperature.

Reference should again be made to FIGURE 10 whereupon it will be seen that transistors were used in the pulse discriminating circuit. Transistor operation is known to be characterized by an increasing collector current with increasing temperature, and this property of transistors, normally considered to be a disadvantage is used to advantage in this invention. A sample of the dynamic characteristic curves of the transistors in the circuit of FIGURE 10 is shown in FIGURES 16 and 17.

FIGURE 17 is a dynamic transfer curve for the first, or $Tr.1$ stage, of the discriminator shown in FIGURE 10. In this example, it will be seen that the static operating point P with no signal is approximately 140 micro-amps. Increasing temperature tends to move the static operating point upward on the curve. However, resistor 128 in FIGURE 10 upon seeing reduced voltage at collector of $Tr.1$, lowers the base current, tending to move the static operating point down the curve. The emitter resistor 129 establishes the zero signal current, in conjunction with resistance 128 so that the static operating point is established in the linear portion of the transfer characteristic $$\left(\frac{\Delta ic}{\Delta ib} = \text{a constant}\right)$$

The overall stage gain is thus held constant for wide fluctuations in temperature.

FIGURE 18 is a similar plot of the second, or feedback stage of the discriminator circuit. This stage is deliberately uncompensated, and the transistor $Tr.2$ is biased in a fixed manner through resistor 133. It will be noted that the static operating point P' is very low, in the region of operation in which stage gain $$\frac{(\Delta ic)}{(\Delta ib)}$$

is highly dependent upon the static operating point. Again, increasing temperature tends to drive the static operating point up, but since there is nothing in this stage to reverse the trend, the stage gain increases directly with temperature increase. Increasing gain in this stage increases the feedback signal to the first stage transistor, $Tr.1$. This effectively increases the overall input sensitivity of the system.

The resistor 129, the emitter biasing resistor, controls the operating level of the circuit, and therefore, by varying the ratio between resistors 128 and 129, the pulse discriminator may be made to follow practically any temperature response curve of a linear nature, that is, the sensitivity of the circuit will increase with increasing temperature at almost any desired rate. The dashed line curve of FIGURE 19 shows the output of the pulse discriminator for various temperatures when it is fed with a signal from a scintillation crystal-photo multiplier-preamplifier unit of the type discussed with regard to FIGURE 11.

The transistors used in the pulse discriminating circuit shown in FIGURE 10 are preferably silicon, since silicon transistors are not rendered inoperative by severe temperature increases. It should be understood, however, that the invention is not limited to silicon transistors, but may include any transistor which remains operative over the temperature range desired.

Although the circuits provided by this invention will function properly and consistently even when subjected to severe temperature changes, it may be desirable to provide a means to insure uniform temperatures in all parts of the circuit and to prevent rapid temperature changes. In FIGURE 16 is shown a thermal control means which effectively accomplishes such purpose.

In that figure, the numeral 150 designates a container made of any suitable material, such as brass. This container is surrounded by a thermal insulation 14 which acts to slow down the heat transfer to the contents of the container. Disposed within the container are the Geiger tubes 41, crystal 42, photo multiplier 43, preamplifier 44 and pulse discriminator 45. The multivibrator 49 associated with receivers 41 is also disposed within the container 150, since the container surrounds frame 82 (FIGURE 9). The numeral 152 designates a material which has the following properties: (1) it is inert electrically, (2) is inert to reaction to all the other elements in the container; and (3) it has a freezing point adjustable within a range between 60 and 200° F. The preferred material is an alloy of paraffin and transformer oil which contains amounts of each constituent such that it melts at approximately 100–110° F.

The even temperature means comprising insulating material 14, container 150, and material 152 operates to insure uniform temperature in the following manner. The insulation 14 slows down heat transfer therethrough. Obviously, the only function of container 150 is to restrict flow of material 152 and support insulation 14. The material 152 when heated to a temperature equal to its melting point begins to melt. The melting results in a semi-liquification. Although a gradual temperature rise of the material and components potted therein results during the melting process, the latent heat of fusion of the material effectively slows down any rapid temperature increase. After the melting occurs, the heat traversing the walls of the container will heat the fluid which in turn will heat the various components. No direct or even semi-direct heat transfer is made between the surroundings of the container and the components contained therein. For this reason a uniform heating, and as a result, a very linear output relationship is experienced between the various components. The dotted line curve in FIGURE 19 shows the temperature output characteristic of the combination circuit and even heating means when the following components were used.

| | |
|---|---|
| Sodium iodide crystal, thallium activated | Dimensions 1″ x 4″. |
| Photo multiplier | RCA 6199. |
| Preamplifier | Two stage transistorized preamplifier shown in FIGURE 15. |
| R-123 | 25K ohm. |
| C-124 | 200 mmf. |
| Tr.1 and Tr.2 | 2N117 (Texas Inst. Co.). |
| R-128 | 14,500 ohm. |
| R-129 | 1,500 ohm. |
| C-130 | 200 mmf. |
| R-131 | 4,700 ohm. |
| C-132 | .01 mfd. |
| R-133 | 1M ohm. |
| R-137 | 30K ohm. |
| Material 152 | ¼ lb. paraffin to 150 ml. transformer oil. |
| Radiation source | Radium C. |

During the tests the tap on resistor 123 was set such that the pulse discriminator was responsive only to the upper edge of the preamplifier output pulse resulting from bombardment of the crystal by a sharp-peaked gamma radiation photon exiting from a radium C source. Changes in the counting rate as marked on the horizontal axis are of the order of 20%, indicating a shift in response to received energy of less than 1 mev. Accordingly, if the components of the circuitry associated with the selective detector were set such that the circuit respond at room temperatures to photons having an energy of 3.5 mev. or above, the instrument would under temperature increase only respond to photons having an energy above 2.5 mev. This eliminates the response to photons resulting from hydrogen capture, but still allows for reception of gamma radiation chlorine capture, and therefore, the apparatus is sufficiently discriminating for purposes of this invention. Of course, by careful manipulation of the components, closer compensation limits can be achieved. Also, the response curve can be adjusted so that the flat portion is at higher or lower temperatures, by adjusting the value of emitter bias resistor 129.

It should be understood that the provision of material 152 is not essential. The material aids in slowing down the heating of the components, and therefore is desirable. The thickness of the paraffin is not sufficient to moderate the radiations received by the detectors.

*Modifications*

Although this invention has hereinabove been discussed with regard to a particular preferred method and particular apparatus, it is readily apparent that various modifications may be made in both method and apparatus. Since the basis of the invention lies in the fact that the hydrogen content and chlorine content of a fluid reservoir do not vary proportionately when oil or gas are present in the reservoir, any energy levels may be detected which vary in accordance with the variation of those elements. For example, the selective detector discussed above may be set to respond to only gamma ray photons having an energy 6 mev. and still the same output relations between full spectrum and selective detectors would be experienced since some photons resulting from chlorine decay subsequent to capture have energies above that level.

Moreover, it is not necessary to detect the total radiation having an energy above the natural level and the radiation having an energy above that of photons resulting from hydrogen decay. Two detectors could be used, one of which was responsive only to gamma ray photons having an energy at or about 2.3 mev. and another which was responsive only to gamma ray photons having an energy between 3.5 and 7 mev., or to photons having an energy of some value between those limits. In this case, one detector would show variations in hydrogen content only, while the other would show variations in chlorine content only. If the outputs were recorded in a similar manner to that proposed by the preferred embodiment, the values of output at various levels could be compared, and again if the outputs were normalized when the detectors were adjacent a salt water reservoir-oil or gas could be identified by a characteristic departure in the outputs, because there is only a characteristic departure in a porous formation when there are non-proportional variations in the hydrogen and chlorine contents. If this modification were adopted, one detector could be responsive to slow neutrons impinging upon it, because the number of slow neutrons impinging upon it would vary in proportion to the number of hydrogen atoms present in the adjacent strata. Of course, a gamma ray log could be run in conjunction with the other measurements to identify any shale formation in which a departure may exist. Using the modification, the comparison would be slightly different than that shown in the preferred embodiment, but a departure in outputs would still indicate the presence of oil or gas.

It should be understood that various other methods may be used which are based on the variation in content of characteristic elements and normalization of detector outputs without transcending the scope of the invention. The method suggested in the preferred embodiment has been employed because it gives satisfactory results under field conditions and allows for the use of relatively simple circuits which do not require delicate adjustment.

Various modifications may also be made to the apparatus provided in the preferred embodiment. For example, the full spectrum detector may utilize a scintillation crystal for a receiver such as that used for the selective detector. If it is desired that the detectors have corresponding detection fields, then the crystals may be placed equidistant on both sides of the neutron source. When a crystal is used for full spectrum detection, a source which emits comparatively little gamma radiation, such as polonium-beryllium would have to be used, because a crystal such as thallium-activated sodium iodide, has a marked sensitivity to radium emission at 1.8 mev., which radiation would interfere with that resulting from hydrogen captures and subsequent decay. The Geiger-Muller tubes provided in the preferred embodiment do not have the marked sensitivity to low-energy photons. If it is found desirable, the receivers may be shielded from slow neutrons by providing a boron shield.

In FIGURE 20 is shown a further modification of the detecting apparatus. A single crystal 161, photo-multiplier 162 and preamplifier 163 are used, and the output from the preamplifier is fed through a mixing circuit 164 to two pulse discriminators 165 and 166 which have been set to respond to different magnitudes of output pulses from the preamplifier. This apparatus would also require the use of a low gamma emission source, but it enables practicing the invention with the use of a single receiver. The circuits employed in this modification may be of any suitable design well known to those skilled in the art. The detectors would be adjusted to respond to pulses received from the mixer stage 164 having energies at, about or above certain levels, depending on the specific method employed.

If in certain instances it is found that significant changing proportions of a heavy element other than chlorine are present, the method may still be utilized by providing detectors which are sensitive only to particular energy photons resulting from chlorine captures.

Conclusion

The objects set forth above, and those which became apparent herein, have been successfully accomplished. Measurements made in accordance with the methods of this invention are not extremely critical, energywise, with regard to information obtained. This allows a comfortable degree of error in setting of circuit response without critically affecting results. Also, there has been provided an apparatus which compensates for temperature changes.

Modifications of this invention other than those herein suggested, will become apparent to those of ordinary skill in the art, after reading this disclosure. Therefore, it is intended that the matter contained in the foregoing description and the accompanying drawings be interpreted in an illustrative sense, and not in a limiting sense, when consideration is given to the appended claims.

We claim:

1. In combination with a radiation receiving and detecting device adapted to be lowered into a bore hole and having a pulse output, a transistor pulse discriminating means comprising first and second transistor stages, wherein said first stage includes a first transistor having a first emitter, a first base and a first collector, a first resistance means connecting said first emitter to ground potential, a second resistance means connecting said first collector to a positive potential, a third resistance means connecting said first collector to said first base, and a first capacitance means connected at one side to said first base and connected at the other side to the output connection of said radiation detecting device, and wherein said second stage includes a second transistor having a second base, a second collector and a second emitter, a wire means connecting said emitter to ground potential, a fifth resistance means connecting said second collector to said source of positive potential, a sixth resistance means connecting said second base to said source of positive potential, a second capacitance means connecting said second resistance means to said sixth resistance means at points between said collectors and said resistance means, and wherein a third capacitance means connects said second collector to said first base.

2. A method of geophysical exploration which comprises irradiating formations adjacent a bore hole with primary particles from a neutron source, receiving, detecting and recording gamma rays generated in the formation by the neutron bombardment within at least two different energy ranges one being above substantially 1.5 mev. and the other being above at least 4 mev., the reception of said gamma rays of both ranges being at a position equally distant from said source, recording said respective levels of detected gamma rays received from formations surrounding said bore hole known to contain substantially only salt water and from unknown formations surrounding said bore hole, the method including normalizing the records with reference to the salt water formations, and comparing the levels of received and detected gamma rays in said respective ranges from the unknown type formations.

3. A method as in claim 2 wherein the distance between said source and detecting point is other than the distance at which there would be no porosity-change effect upon levels of received secondary energy in said respective ranges.

4. In electrical apparatus having a plurality of components each having a different temperature characteristic, means for containing same immersed in an insulating material having a melting point between 60 and 200° F. to maintain all of the components at a like temperature, and by action of the latent heat of fusion to confine the temperature change within predetermined limits.

5. Apparatus as in claim 4 wherein the material is a mixture of transformer oil and paraffin.

References Cited in the file of this patent

UNITED STATES PATENTS

| 2,512,020 | Herzog | June 20, 1950 |
| 2,648,012 | Scherbatskoy | Aug. 4, 1953 |
| 2,752,504 | McKay | June 26, 1956 |
| 2,763,788 | Herzog | Sept. 18, 1956 |
| 2,862,106 | Scherbatskoy | Nov. 25, 1958 |
| 2,899,560 | Nemet | Aug. 11, 1959 |
| 2,905,826 | Bonner et al. | Sept. 22, 1959 |
| 2,996,618 | Goodman et al. | Aug. 15, 1961 |

OTHER REFERENCES

Transistorized Scintillation Counter, by L. A. Kueker, from Radio-Electronics, March 1957, pp. 34–37.